US 6,696,979 B2

United States Patent
Manten et al.

(10) Patent No.: US 6,696,979 B2
(45) Date of Patent: Feb. 24, 2004

(54) DOUBLE DOOR SECURITY SYSTEM FOR AIRCRAFT AND THE LIKE

(76) Inventors: Howard Manten, 6235 SW. 114 St., Miami, FL (US) 33156; Francisco J Avellanet, 1261 Venetia Ave., Coral Gables, FL (US) 33134

( * ) Notice: Subject to any disclaimer, the term of this patent is extended or adjusted under 35 U.S.C. 154(b) by 0 days.

(21) Appl. No.: 10/091,824

(22) Filed: Mar. 6, 2002

(65) Prior Publication Data
US 2003/0169184 A1 Sep. 11, 2003

(51) Int. Cl.⁷ .............................................. G08B 21/00
(52) U.S. Cl. .................. 340/945; 180/287; 244/118.5; 348/148
(58) Field of Search ................. 340/945, 963, 340/971, 426, 5.2, 5.53, 5.32, 5.72, 5.52, 5.82, 5.83; 180/287, 271; 348/143, 156, 152, 117, 148; 70/91, 93; 244/1 R, 118.5, 129.5, 117 R, 118.6, 119, 120, 129.1; 701/3, 9, 14; 109/68, 58, 78, 67, 69, 70

(56) References Cited

U.S. PATENT DOCUMENTS

| | | | | |
|---|---|---|---|---|
| 3,658,277 A | * | 4/1972 | Anderson | 244/1 R |
| 3,704,845 A | * | 12/1972 | Ord | 244/121 |
| 3,811,643 A | * | 5/1974 | Pizzo | 244/1 R |
| 4,627,193 A | * | 12/1986 | Schwarz | 49/42 |
| 6,158,692 A | * | 12/2000 | Abild et al. | 244/129.5 |
| 6,308,644 B1 | * | 10/2001 | Diaz | 109/6 |
| 6,424,249 B1 | * | 7/2002 | Houvener | 340/5.82 |
| 6,474,599 B1 | * | 11/2002 | Stomski | 244/118.5 |
| 6,499,693 B1 | * | 12/2002 | Rogson | 244/118.5 |

* cited by examiner

Primary Examiner—Brent A. Swarthout
(74) Attorney, Agent, or Firm—Patrick J. Walsh

(57) ABSTRACT

A passenger aircraft security system provides double doors at the entrance to the cockpit and rearranges the adjacent galley and restroom and creates a vestibule or passageway between them fitted with parallel inner and outer doors with special locking devices so as to provide guarded access to the cockpit from the passenger cabin. Modified embodiments are disclosed for marine vessels and railway locomotives and subway cars.

9 Claims, 4 Drawing Sheets

DOUBLE DOOR SECURITY SYSTEM FOR AIRCRAFT AND THE LIKE

BACKGROUND OF THE INVENTION

The present invention relates to aircraft safety and particularly to a system for protecting operating personnel situated in the cockpit of passenger aircraft from attack by hijackers situated in the passenger section of the aircraft. The invention also relates to a system for protecting operating personnel of railway locomotives and marine vessels.

Aircraft cockpits are provided with a single lightweight door separating the flight deck crew from the passenger cabin with the door being usually closed and sometimes locked during flight of the aircraft. Unlocking and opening of the door during flight is normally restricted to the cabin crew by communication with the flight deck either by the aircraft's telephone system or by simply knocking on the door and entering using a key kept by the cabin crew. Passengers are normally able to approach the cockpit door in the course of using the forward head of the aircraft or by approaching the forward galley both of which facilities are situated adjacent to the cockpit door.

In the present order of things, security of an aircraft flight deck and flight deck crew relies heavily on the effectiveness of pre-boarding passenger screening to ensure that weapons fabricated of metal are not boarded, and on the assumptions that passengers will obey flight crew instructions restricting access to the area adjacent the cockpit door during flight and will not interfere with the flight crew in any way regarding operation of the aircraft. Needless to say, these measures and restrictions have proven to be inadequate for security of flight deck and crew.

The invention also provides a system for securing a railway locomotive cab and a bridge of a marine vessel against unwanted or unauthorized intrusion.

The present invention provides a system for securing an aircraft cockpit against unwanted or unauthorized intrusion from the passenger cabin of the aircraft.

SUMMARY OF THE INVENTION

In accordance with the present invention, a passenger aircraft interior is arranged by installing double doors at the entrance to the cockpit and rearranging the adjacent galley and restroom. The galley and restroom according to a preferred embodiment of the invention are situated on opposite sides of an aircraft cabin creating a vestibule or passageway between them. The vestibule is fitted with parallel inner and outer sliding doors of robust bulletproof construction with special locking devices so as to provide guarded access to the cockpit from the passenger cabin. The door locks are opened and closed with a special key, or by a biometric recognition system such as retina, facial, fingerprint, hand geometry and voice recognition of a member of the crew or other authorized personnel. The door locks are also interactive such that during aircraft operation, the inner and outer doors are each unlocked, opened, closed and relocked sequentially for cockpit entry and exit. The vestibule is equipped with visual means such as a video camera or double glazed door panel or window permitting the cockpit crew to see who is trying to gain access to the cockpit. The bulkhead separating the forward head or restroom and galley from the cockpit is bulletproof with light weight, thick Plexiglas, Kevlar or equivalent material.

One of the preferred requirements of the invention is to have the cockpit crew enter the cockpit and secure the cockpit vestibule doors prior to passengers boarding the aircraft. In this way the flight deck crew need not have any contact with passengers when the crew has secured the cockpit.

In accordance with a preferred aspect of the invention, the cockpit crew has access to the forward head through a cockpit-side door available only to the cockpit crew.

Any food or refreshment for the cockpit crew can be passed into the vestibule which is then locked on the passenger side and opened on the cockpit side.

Modified embodiments of the invention for railway and for marine use are also disclosed.

Specific systems are included in the following description for purposes of clarity, but various details can be changed within the scope of the present invention.

OBJECTS OF THE INVENTION

An object of the invention is to provide an aircraft security system for the protection of flight deck crew and to ensure authorized operation of an aircraft.

Another object of the invention is to provide an aircraft cabin configuration restricting access to the cockpit to authorized personnel.

Another object of the invention is to provide an railway locomotive cab configuration restricting access to the cab to authorized personnel.

Another object of the invention is to provide a marine vessel bridge configuration restricting access to the bridge to authorized personnel.

Other and further objects of the invention will become apparent with an understanding of the following detailed description or upon employment of the invention in practice.

BRIEF DESCRIPTION OF THE DRAWING

A preferred embodiment of the invention has been chosen for detailed description to enable those having ordinary skill in the art to which the invention appertains to readily understand how to construct and use the invention and is shown in the accompanying drawing in which.

DETAILED DESCRIPTION OF THE PREFERRED EMBODIMENT

Figure 1:
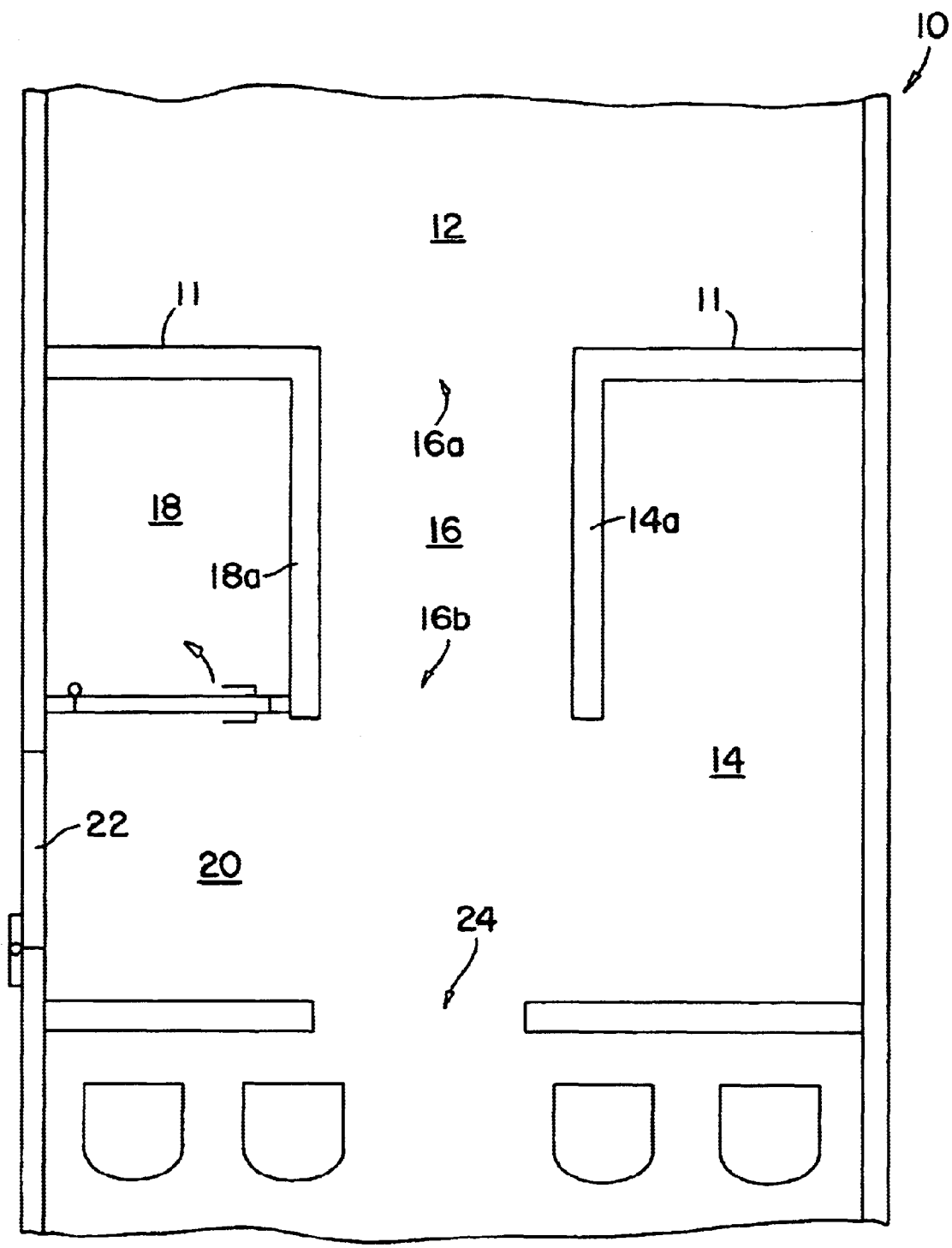
FIG. 1 is a schematic fragmentary plan view of an aircraft cabin illustrating a preferred embodiment of aircraft cabin layout according to the invention.

Referring to FIG. 1 of the drawing, an aircraft cabin 10 is partitioned to define several spaces including flight deck or cockpit 12, forward galley 14, cockpit vestibule 16, forward head or restroom 18, aircraft entryway 20 through entry door 22, and passenger cabin 24.

Figure 2:
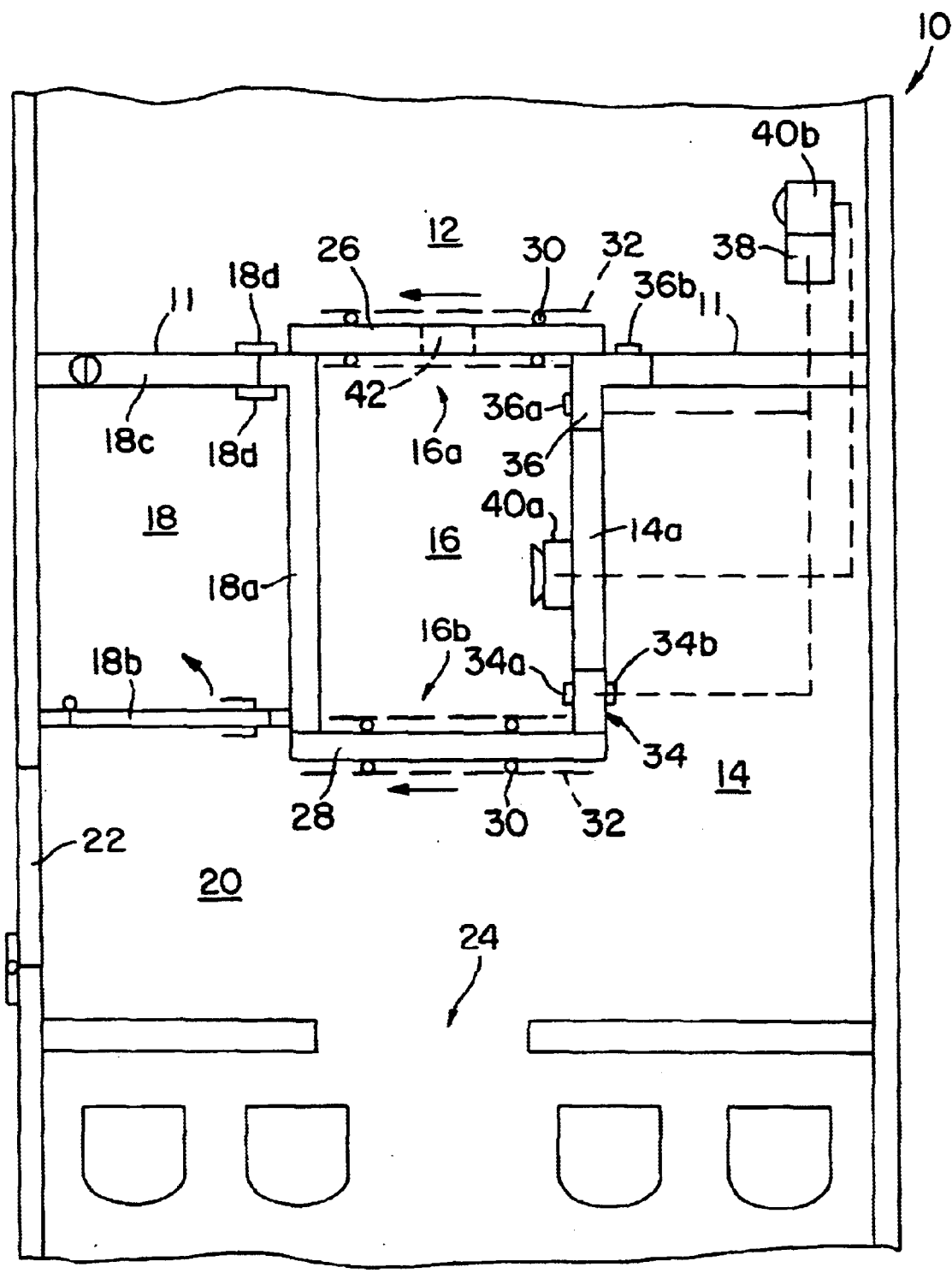
FIG. 2 is a schematic fragmentary plan view of aircraft cabin of FIG. 1 illustrating a preferred embodiment of double door security system according to the invention.

In accordance with the preferred embodiment of the invention, a transverse bulkhead 11 extending between opposite sides of airframe 13 defines the aft partition of the cockpit and forward partition of cabin space including the forward galley 14, cockpit vestibule 16 and forward head 18. The transverse bulkhead has a cockpit doorway 11a providing access to the cockpit from the passenger cabin. The galley and restroom in this preferred embodiment of the invention are situated on opposite sides of the aircraft cabin creating between them the cockpit vestibule or passageway leading to the cockpit doorway. The vestibule is positioned amidships between the longitudinal partitions 14a, 18a of galley and head. As shown in FIG. 2, the vestibule is enclosed by an inner door 26 for closing the cockpit doorway 11a and outer door 28 for closing the passenger doorway 16b from the vestibule into the passenger cabin. The vestibule 16 with double doors 26, 28 provides guarded access to the cockpit.

The vestibule inner 26 and outer 28 interacting sliding doors are generally parallel to each other and are mounted with suitable rollers 30 and guiding channels 32 or other suitable supports. The sliding doors are of robust bulletproof construction with special locking devices 34, 36 so as to provide guarded access to the cockpit from the passenger cabin. The door locks are opened and closed with a special key, or by a personnel or biometric recognition system forming a component of the aircraft's computer system such as retina, facial, fingerprint, hand geometry or voice recognition of a member of the crew or other authorized personnel. Each of the door locks is provided with dual opening means 34a, 36a positioned in the vestibule for each lock, and dual opening means 34b, 36b positioned in the galley or aircraft entryway for the outer door and in the cockpit for the inner door.

A door control unit 38 forming part of the aircraft computer system is located in the cockpit is programmed for monitoring the operating position of the door locks, and for ensuring sequential door operation when an authorized person enters or leaves the cockpit. In this way, the inner and outer sliding doors and their door locks are interacting during aircraft operation in that the doors are each unlocked, opened, closed and relocked sequentially and not simultaneously for cockpit entry and exit. So, to enter or leave the cockpit one of the outer door and the inner door is opened while the other remains closed and locked, an authorized person enters and remains in the vestibule as the one door is closed and locked, and leaves the vestibule as the one door remains closed and locked and the other door is unlocked and opened. To enter the cockpit, for example, a crew member actuates the outer door lock at the galley station 34b by means of a key or personal identification and with the inner door 26 in a closed and locked condition. Next, the crew member enters the vestibule, closes and locks the outer door at the vestibule station 34a. In like manner and with the outer door closed and locked, the crew member at station 36a unlocks and opens the inner door for entry to the cockpit.

The flight deck crew is made aware by suitable visual or audible signal at the door control unit 38 that the cockpit is being entered. The flight deck crew has the door control unit 38 to override any attempt to unlock the inner and outer door locks and to keep the locks on, if necessary, or to unlock both the outer and inner doors for emergency exit of the aircraft or other reason. Normally, when the aircraft entry door 22 is open, the vestibule outer and inner doors are unlocked.

The vestibule and cockpit are equipped with visual means such as a video camera 40a and monitor 40b or inner door window 42 permitting the cockpit crew to monitor the vestibule space at all times without the need to open the inner double door and in particular to see each person trying to gain access to the cockpit.

The transverse bulkhead 11 separating the forward head or restroom and galley from the cockpit as well as the inner galley 14a and restroom 18a partitions and each of the double doors 26, 28 are bulletproof with light weight, thick Plexiglas, Kevlar or equivalent material.

The restroom 18 may be entered from the passenger cabin through a conventional door 18b which can be a single or double fold door when the vestibule outer door 28 is closed and locked. The outer door 28 when opened is situated in closing relation to the restroom access door 18b so that no one may enter or exit the restroom.

One of the preferred aspects of the invention is to have the cockpit crew enter and secure the cockpit vestibule doors prior to passengers boarding the aircraft. In this way the flight deck crew need not have any contact with passengers when the crew has secured the cockpit.

In another preferred embodiment according to the invention, the cockpit crew has access to the forward head through a cockpit door 18c available only to the cockpit crew. In this arrangement, the forward partition or bulkhead 11 of the restroom is fitted with door 18c having inner and outer locks 18d opened and closed with a special key, or by a personnel recognition system forming a component of the aircraft's computer system such as retina, facial, or fingerprint recognition of a member of the crew similar to the vestibule double doors. Suitable "occupied" and "vacant" lamps or other indicia are used on cockpit-side 18c and passenger-side 18b restroom doors to protect privacy of restroom usage.

Any food or refreshment for the cockpit crew can be passed into the vestibule which is then locked on the passenger side and opened on the cockpit side.

Figure 3:
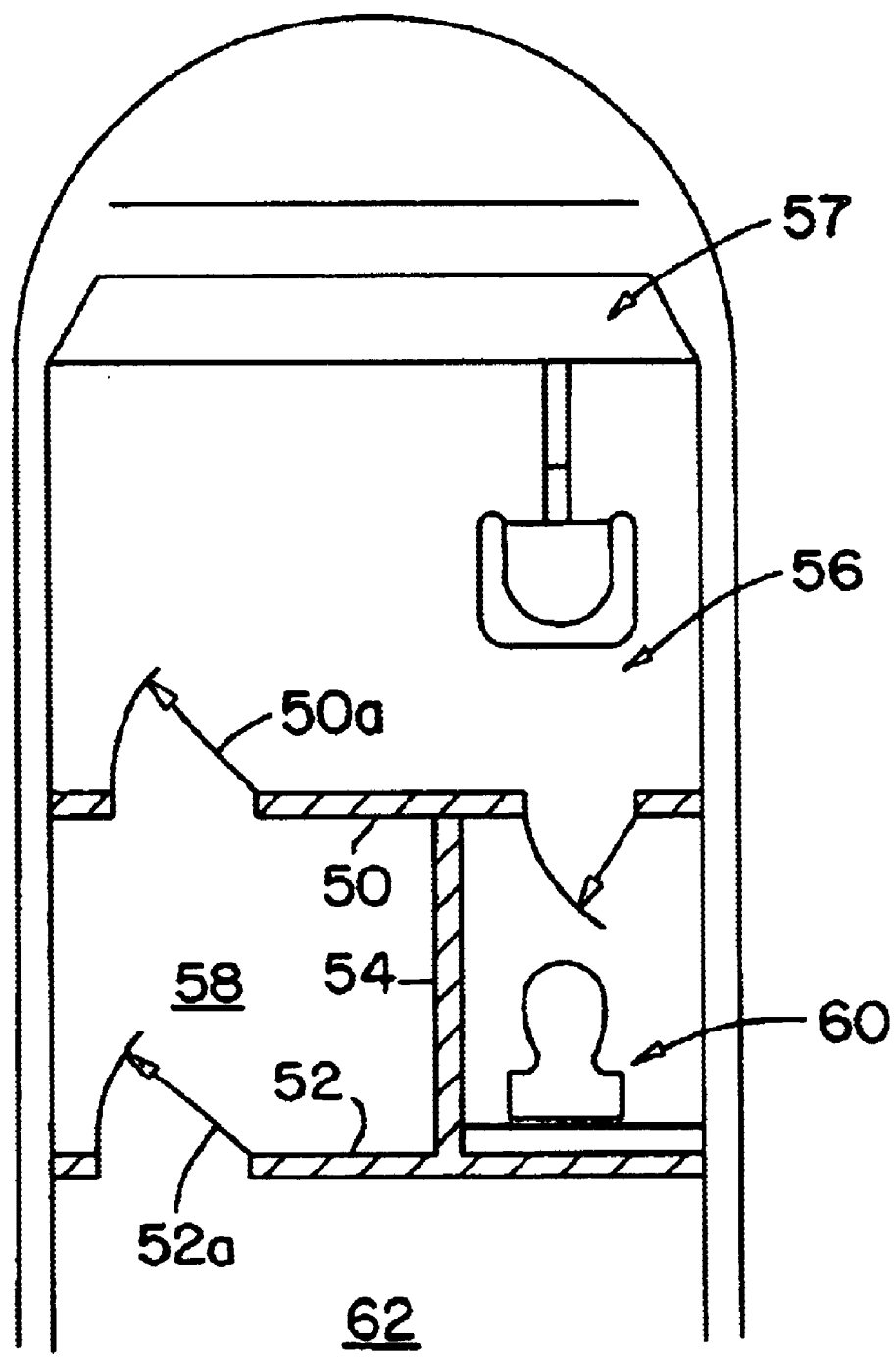
FIG. 3 is a schematic fragmentary plan view of railway locomotive or subway cab illustrating a modified embodiment of double door security system according to the invention.

In accordance with a modified embodiment of the invention shown in FIG. 3, double transverse bulkheads 50 and 52 and longitudinal partition 54 define a railway operating cab 56 with instrument panel 57, cab vestibule 58 and lavatory 60. The transverse bulkheads have vestibule door 50a and 52a providing access to the cab from the passenger cabin 62.

The doors 50a and 52a may be provided with the same locking system of the embodiment of FIGS. 1 and 2. The vestibule and cab may be provided with the same video monitoring system as for FIGS. 1 and 2.

Figure 4:
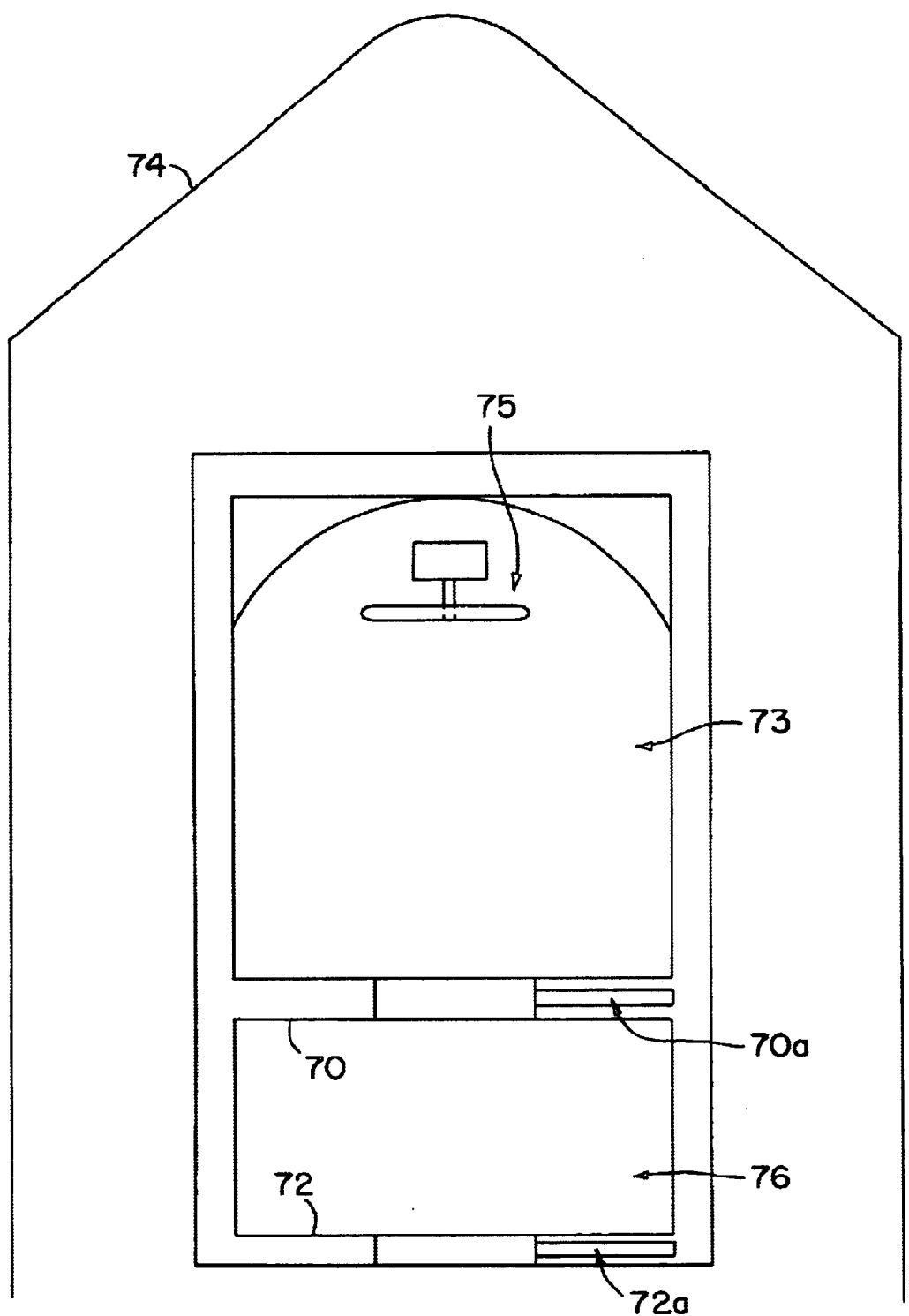
FIG. 4 is a schematic fragmentary plan view of a marine vessel bridge illustrating a modified embodiment of double door security system according to the invention.

In accordance with another modified embodiment of the invention shown in FIG. 4, double transverse bulkheads 70 and 72 define a bridge or pilothouse 73 with ship's wheel 75 for a marine vessel 74 and bridge vestibule 76. The transverse bulkheads have sliding vestibule doors 70a and 72a providing access to the bridge.

The doors 70a and 72a may be provided with the same locking system of the embodiment of FIGS. 1 and 2. The vestibule 76 and pilothouse 73 may be provided with the same video monitoring system as for FIGS. 1 and 2.

Various changes may be made to the structure embodying the principles of the invention. The foregoing embodiments are set forth in an illustrative and not in a limiting sense. The scope of the invention is defined by the claims appended hereto.

We claim:

1. An aircraft cabin security system for guarding access to the aircraft flight deck from an aircraft passenger cabin comprising a transverse bulkhead extending between opposite sides of the airframe and defining a rear partition of the flight deck and forward partition of the passenger cabin, the transverse bulkhead having a doorway for passage into the cockpit, a pair of longitudinal partitions extending aft of the transverse bulkhead beginning from opposite sides of the cockpit doorway, the pair of partitions defining therebetween a vestibule positioned amidships for approaching the cockpit doorway, the vestibule longitudinal partitions defining a passenger cabin doorway, the vestibule further defined by an inner door for closing the cockpit doorway and an outer door for closing the passenger cabin doorway, the inner door and the outer door having locking means for restricting access to the flight deck, a galley and restroom situated on opposite sides of the cabin immediately abaft the transverse bulkhead, the galley defined by one of said longitudinal partitions, a portion of the transverse bulkhead, and a portion of airframe, the restroom defined by the other of said longitudinal partitions, a portion of the transverse bulkhead, and a portion of airframe, and the aircraft entry door situated aft of said passenger cabin doorway.

2. An aircraft cabin security system as defined in claim 1 which further includes visual means enabling a flight deck crew member to monitor the vestibule.

3. An aircraft cabin security system as defined in claim 1 which further includes a video camera in the vestibule and a video monitor in the flight deck enabling a flight deck crew member to monitor the vestibule.

4. An aircraft cabin security system as defined in claim 1 which further includes a window through the inner door enabling a flight deck crew member to monitor the vestibule.

5. An aircraft cabin security system as defined in claim 1 which further includes a biotechnology recognition system for opening the inner door and outer door locking means.

6. An aircraft cabin security system as defined in claim 1 in which the inner door and outer door have interacting door locks so that the doors are each unlocked, opened, closed and relocked sequentially for cockpit entry and exit.

7. An aircraft cabin security system as defined in claim 1 in which the inner door and outer door have interacting door locks so that the doors are each unlocked, opened, closed and relocked sequentially for cockpit entry and exit, the door locks arranged for opening and closing only by authorized personnel, and door control means enabling the flight deck crew to override door lock operation for maintaining locked condition of the doors, and for opening the door locks for emergency exit.

8. An aircraft cabin security system as defined in claim 7 in which the door locks are opened by a key.

9. An aircraft cabin security system as defined in claim 7 in which the door locks are opened by a personnel recognition system.

* * * * *